Feb. 17, 1970   F. G. BROCKARDT   3,495,564
VIBRATION DAMPENER

Filed April 11, 1968   2 Sheets-Sheet 1

INVENTOR.
FRANK G. BROCKARDT
BY Eyre, Mann & Lucas
ATTORNEYS

Feb. 17, 1970  F. G. BROCKARDT  3,495,564
VIBRATION DAMPENER

Filed April 11, 1968  2 Sheets-Sheet 2

INVENTOR.
FRANK G. BROCKARDT
BY Eyre, Mann & Lucas

ATTORNEYS

United States Patent Office 3,495,564
Patented Feb. 17, 1970

3,495,564
VIBRATION DAMPENER
Frank G. Brockardt, Wheeling, W. Va., assignor to Bethlehem Gear and Machine Co., a corporation of West Virginia
Filed Apr. 11, 1968, Ser. No. 720,718
Int. Cl. B63h 21/26
U.S. Cl. 114—146      11 Claims

ABSTRACT OF THE DISCLOSURE

This invention relates to a method of controlling outboard motor oscillations by providing a fluid filled cylinder having a moveable element mounted therein, which divides the cylinder into two smaller fluid chambers. Means are provided within the fluid filled cylinder for establishing fluid communication between the two smaller fluid chambers. Resilient means are preferably provided to control the steady state position of the moveable element within the cylinder. The resilient means either form part of the device itself or comprise part of an existing steering system.

---

Outboard motor oscillations are commonly experienced in motor boats at low engine speeds, usually while slowly trolling for fish. These oscillations generally take the form of a severe snapping action in which the outboard motor snaps back and forth about its pivot, thereby forcing the steering system to respond in like manner. The steering system generally includes a steering cable, steering wheel, and cable drum, all of which must respond to the oscillatory input of the motor and in so responding effective control of the directional attitude of the boat may be lost.

Present steering systems are generally not equipped to control or compensate for motor oscillations. The most usual practice is to install resilient elements between the ends of the steering cable and the boat transom, but these resilient elements generally function only to tighten the steering cable so as to remove slack therefrom while responding fully to oscillatory motor inputs to the steering system. Some damping may be realized from these resilient elements depending on the choice of resilient material, but the amount of damping is usually insufficient to control or significantly reduce the magnitude or frequency of these oscillations. It is possible, under certain conditions, for these resilient elements to attenuate the amplitude and frequency of the oscillations, thereby aggravating an already severe problem.

The present invention effectively controls and reduces the amplitude and frequency of undesirable motor oscillations and is adaptable to steering systems which utilize resilient means for cable tightening as described above. However, the preferred form of the invention combines the features of cable tightening and system damping in a single device. Any number of these devices may be used within a steering system. However, it is preferred that at least one and not more than two be used. Additionally, the device of the present invention may be mounted at almost any point within the steering system. A preferred mount however is between a cable end and the boat transom. The device may also be mounted outside of the steering system and in this instance the device is connected directly between the motor and transom.

The invention comprises a fluid chamber divided into a plurality of subchambers by a moveable element mounted therein. The moveable element, preferably a piston, is adapted to provide for flow of fluid between the subchambers. The flow of fluid between the subchambers is adjusted to a predetermined maximum level, this maximum level being a function of the amount of damping desired in the particular steering system at hand.

Generally, the dampening device is mounted in the steering system in such manner so as to allow relative movement between the moveable element and fluid chamber. This can be accomplished by attaching the fluid chamber to one part of the steering system and by providing means for attaching the piston to a second adjacent part of the system as by means of a piston rod, wherein a tensile force in the system will tend to increase the overall length of the device by pulling the piston towards one end of the fluid chamber.

The device hereinbefore described cannot in and of itself continue to operate if a steady unidirectional force is applied to urge the piston and fluid chamber in opposite directions since the fluid will eventually flow out of one subchamber into the other in response to the steady unidirectional force. Obviously, in a situation such as this, the piston and fluid chamber will travel in opposite directions until the confines of the fluid chamber prohibits further movement. If this should occur, the device would no longer be effective as a dampener against the unidirectional force. Furthermore, if the device is mounted in a steering cable, the device would become totally ineffective as a dampener under the above conditions since the cable is capable of applying only a tensile force so that a reversal of the direction of the applied force is not possible. Under these circumstances, it is necessary to provide means wherein the moveable element within the fluid chamber can be prevented under most conditions from traveling to an end of the fluid chamber and can be returned to a selected operable position within the chamber when the unidirectional force is removed. This is necessary in order to maintain the damping capability of the device at substantially all times. This can be accomplished by mounting the device in, for instance, a steering system kept taut by resilient means wherein the resilient means will constantly urge the moveable element to slide back into the selected operable position in the cylinder. However, the preferred form of the invention combines these two features by providing resilient means, preferably a spring, positioned inside the fluid chamber, whereby the two functions of cable tightening and system damping are combined in a single device. The spring may be either a tension or compression spring, preferably the latter, since compression springs generally outlive tension springs in this application. However, both tension and compression springs may be used concurrently within the same device. The resilient means should be mounted within the fluid chamber in a manner such that if the piston is attached to the cable and the fluid chamber is attached to the transom, then the resilient means will urge the piston towards the transom, thereby tightening the cable and concurrently establishing a selected operable position of the piston within the fluid chamber. If the device is mounted outside the steering system between motor and transom as described above, then the operable position of the moveable element is controlled by motor position and it is superfluous to provide means for controlling the operable position of the moveable element within the fluid chamber. However, it is not necessary to remove the means for controlling the operable position of the moveable element from a device having such as its presence does not adversely affect its performance when the device is mounted between motor and transom.

Referring now to the drawings wherein like numerals refer to like parts:

Figure 1:
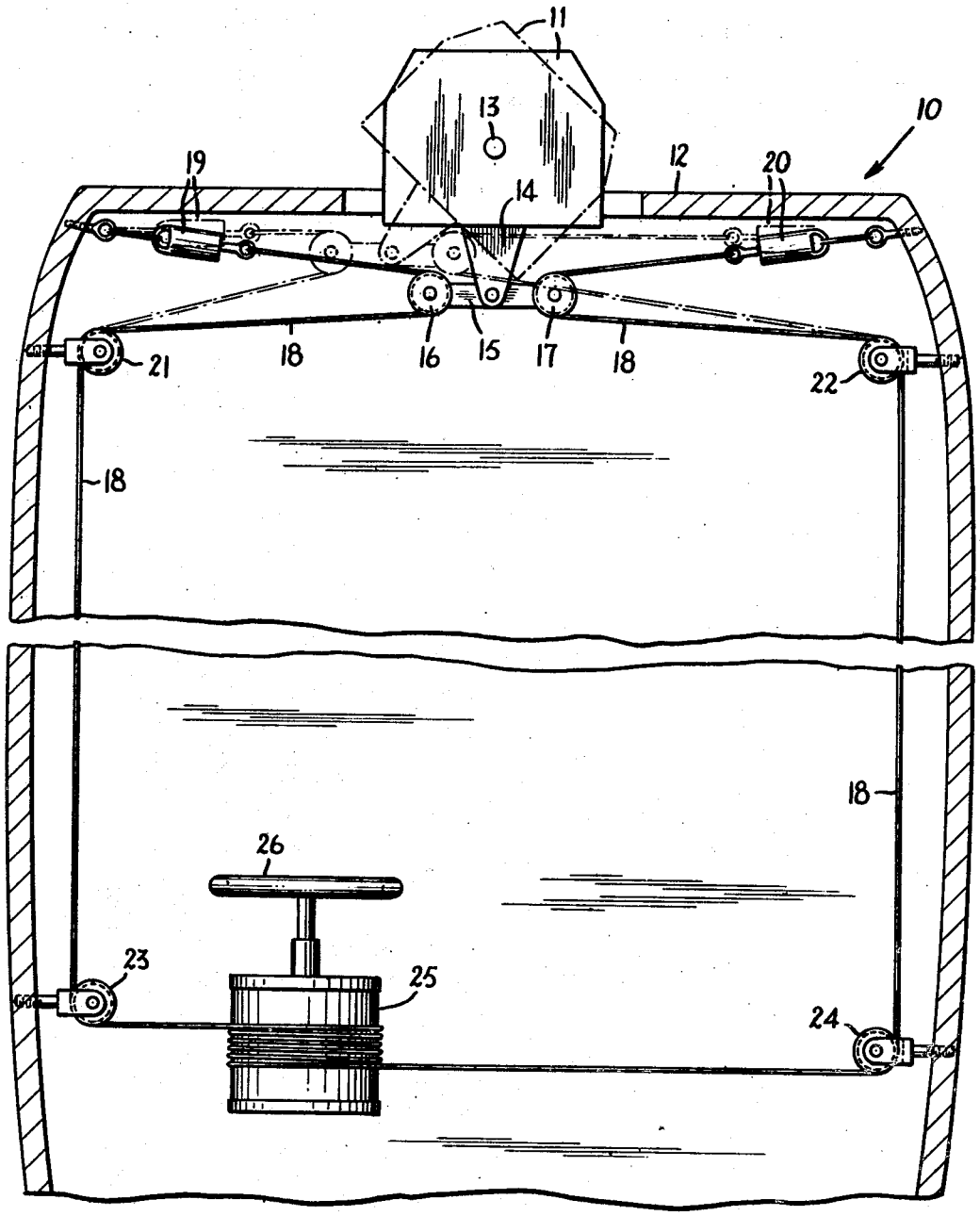
FIG. 1 is a top plan schematic of the necessary elements of a preferred steering system for an outboard motor boat.

FIG. 1 illustrates the outline of a boat 10 having an outboard motor 11 mounted in conventional manner to the transom 12, the motor being pivotable about pivot point 13. Attached to the front of the motor is a carrying plate 14 to which sheave bar 15 is pivotably mounted. Sheave bar 15 has a pair of pulleys 16 and 17 rotatably mounted thereon, said pulleys carrying a cable 18 in grooves therein (not shown). The ends of the cable 18 are attached to dampeners 19 and 20 which are the subjects of the present invention, said dampeners providing the dual functions of cable tightening and system damping. The dampeners are in turn attached to the transom 12.

The cable 18 is directed from pulleys 16 and 17 to a diagonally opposed pair of rotatable anchor pulleys 21 and 22 and from anchor pulleys 21 and 22 to a second set of diagonally opposed rotatable pulleys 23 and 24 from which the cable 18 is directed to a drum 25. Attached to the drum 25 is a steering wheel 26 which, when rotated, will feed cable from drum 25 in the direction of rotation of the drum.

Figure 2:
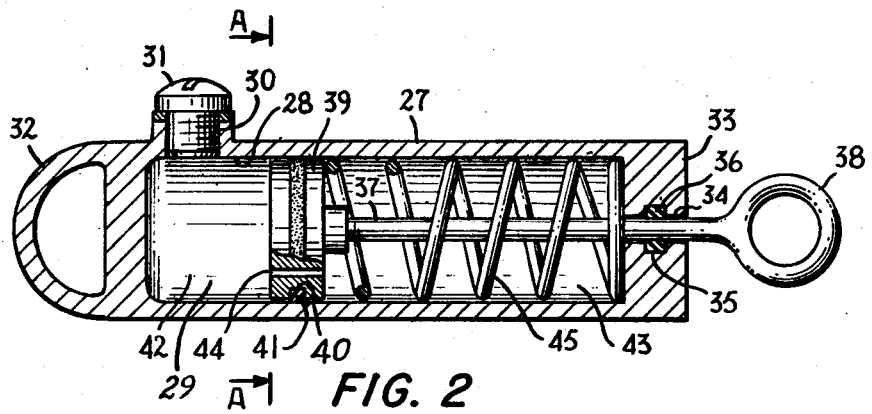
FIG. 2 is a sectional view of the preferred embodiment of the invention.

FIG. 2 illustrates a preferred embodiment of a dampener 19. The dampener has a cylindrical body 27 having a cylindrical chamber 28 therein. The chamber 28 is filled with a fluid 29, preferably oil, the fluid being introduced into the chamber through an opening 30 formed in cylinder body 27. After the fluid has been introduced into the chamber, the opening 30 is closed by a releasable plug 31, preferably a screw, in order to prevent fluid loss from the chamber 28. The cylinder body 27 has a ring 32 formed at one end thereof, the ring providing means whereby the cylinder body is mounted within the steering system.

The end of the cylinder body 27 opposite the ring 32 has an end wall 33, the end wall having a passage 34 formed therein, the passage being coaxial with chamber 28. The passage 34 has an annulus 35 formed therein of larger diameter than the passage 34, the annulus carrying a conventional rod gland 36 therein. A piston rod 37 is slidably carried in passage 34, the rod gland 35 providing a seal between the chamber 28 and the piston rod to prevent fluid leakage past the piston rod to ambient. The piston rod has a ring 38 attached thereto at the end external to the chamber 28, the ring serving to mount the piston rod within a steering system.

The end of piston rod 37 opposite ring 38 is mounted to a piston 39. Piston 39 is slidably mounted in chamber 28, is cylindrical in shape and has a diameter slightly smaller than that of chamber 28. The piston 39 has an annulus 40 cut circumferentially into its surface, the annulus carrying conventional packing 41 therein. The packing 41 provides a fluid seal between the circumference of piston 39 and chamber 28, thereby separating chamber 28 into two subchambers 42 and 43.

In order to achieve damping from the device of FIG. 2, fluid communication is established between the two subchambers 42 and 43. This is preferably accomplished by a port 44 in piston 39, the port allowing fluid to flow between the chambers 42 and 43 in response to piston movement.

Disposed between piston 39 and end wall 33 is a compression spring 45, the spring serving to bias the piston 39 in a leftwardly direction. In the preferred embodiment, the steering cable is connected to ring 38 and the ring 32 is connected to the boat transom. In this instance the spring, by reacting against end wall 33, will urge the piston 39 leftwardly while concurrently pulling the cable taut. Obviously, the leftward movement of the piston will cease when the tension in the cable becomes equal to the forces urging the piston leftwardly, thereby establishing the selected operable position of the piston. It will be understood that the device can be reversed and ring 38 may be attached to the boat transom and ring 32 may be attached to the steering cable 18. Operationally, it performs the same function.

Figure 3:
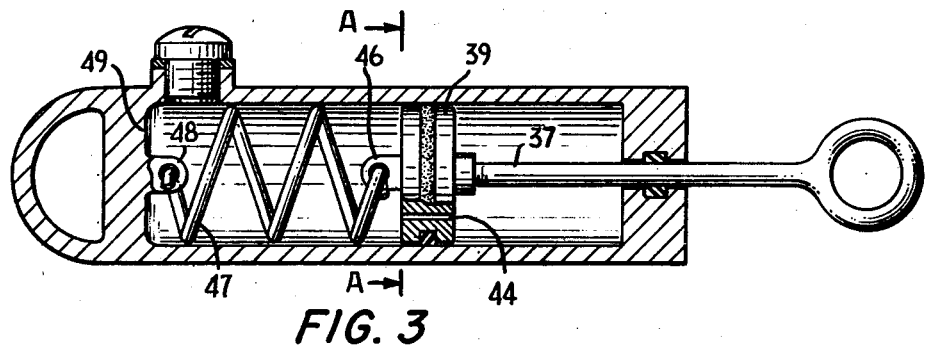
FIG. 3 is a sectional view of a second embodiment of the invention.

FIG. 3 illustrates another embodiment of the dampener wherein a tension spring is used rather than a compression spring. Since the structure of the embodiment of FIG. 3 is in most aspects similar to that of FIG. 2, the same numerals will be used to indicate like parts. In this embodiment, piston 39 has an annular ring 46 formed on one surface thereof, the ring serving as an attachment point for one end of a tension spring 47. The other end of the spring 47 is mounted to a second attachment ring 48 formed on the inner wall 49 of chamber 28. Operationally, there is no difference between the embodiment of FIG. 2 and that of FIG. 3 since the spring 47 will urge the piston 39 in the same leftward direction to tighten the cable and establish the selected operable position of the piston.

In operation, assuming that the ring 32 (FIG. 2) is attached to the boat transom and ring 38 is attached to the cable, the spring 45 will urge the piston 39 leftwardly to tighten the cable and establish a selected operable position of the piston. If, however, severe oscillations are present such that at a given point the tension in the cable has been relieved, then the spring 45 will urge the piston 39 leftwardly to re-establish an equilibrium between cable tension and spring force. The pressure differential thus created between the two chambers 43 and 44 will cause fluid to flow from subchamber 44 to subchamber 43, the maximum rate of flow being governed by the size of the port 44. If the pressure differential between chambers is great enough to require a flow rate higher than the port is capable of allowing, then the piston speed will be governed by the maximum flow rate allowed by the port. Thus, the port can effectively reduce the speed of the piston. If oscillations are present, the cable will experience an alternating stress whereby the stress alternates between a value of zero and some finite tensile value. In this instance, assuming that the cable has first been relieved of stress, the piston 39 will move leftwardly at a rate governed by the port 44 in piston 39. At some point before the piston 39 has completed its travel, the stress will reverse and the cable will be under tension, thereby urging the piston 39 rightwardly in the chamber 28, the motion being opposed by spring 45. In this instance, the pressure differential created between subchambers 43 and 44 will now force fluid to flow from subchamber 43 to subchamber 44, the rate of fluid flow between subchambers controlled by the size of port 44. Therefore, stress reversals in the system due to oscillations will generally take place before the piston has been allowed to travel as far as it would have had there been no damping in the system. From this, it follows that the above device limits the amplitude of oscillation since the amplitude is now a function of piston travel. Furthermore, the frequency of oscillation will be lower since the damping introduced into the system must be taken into account in the general system response equation. However, the above operational description is in terms of the device and not in terms of its system operation. Just considering the device itself apart from the steering system, regulation of the amplitude of oscillation cannot be controlled when the oscillation is such as to relieve the tensile stress in the cable.

System operation of the present invention can be understood by referring to FIG. 1, wherein two dampeners 19 and 20 are connected between the cable ends and the boat transom 12. Assuming the motor 11 is oscillating about its pivot 13 and that at a given instant the motor 11 is in the position indicated in phantom, then the dampener 19 would be experiencing a loss of tension in the section of cable 18 immediately before it while dampener 20 will be experiencing an increase in tension in the section of cable immediately in front thereof. Therefore, dampener 20 will be acting as a restraint on the oscillatory motion of the motor 11 as discussed above in reference to the dampener wherein the tensile load in the cable increases. However, the system itself provides a further benefit since the unbalance in force created by the oscillation of the motor within the cable system on either side of the motor will cause the drum 25 to rotate in a direction to take up slack in the cable and re-establish equilibrium therein. This means that in effect, the dampener 19 does not become fully unloaded, while the dampener 20 becomes full loaded. Therefore, the piston travel within dampener 19 will be further restricted by the system itself so that when the oscillation reverses, the piston in dampener 19 will not have traveled as far as it would have if the system weren't compensatory in nature, thereby further reducing the amplitude of oscillation.

The embodiment of FIG. 3 is similar in operation to that of FIG. 2 and it is therefore deemed to be unnecessary to describe its operation.

When utilizing the device the device in an outboard motor boat having an outboard motor of between 30 and 60 horsepower, the preferred internal diameter of the fluid cylinder is approximately between ¾ and 1 inch for a port size of 1/32 to 1/16 inch diameter if a low viscosity hydraulic brake fluid of about SAE 80 is used. The spring should be such as to exert a force of betwen 40 and 100 pounds on the piston when the piston is in its selected position within the fluid chamber after the dampener has been placed within the steering system. However, it is preferred that the force exerted by the spring be between 60 and 80 pounds, thereby yielding quick steering response without unduly increasing the effort needed to operate the steering system.

The internal length of the fluid chamber 28 is preferably at least long enough to allow the piston to reach the end of its travel without the piston coming into contact with an end of the fluid chamber. The length of travel necessary is dependent on the change in geometry of the steering system which occurs when the outboard motor pivots from full pivot on one side to full pivot on the other, thus effectively necessitating an increase in the overall length of the steering cable. This change in overall length can be calculated by known simple geometric relationships. However, it is preferred that the internal length of the fluid chamber be between approximately 3 and 5 inches for a piston thickness of approximately ¾ to 1¼ inches or equivalent for a different range of piston thickness.

Internal dimensions will vary according to the power output of the particular motor and with the viscosity of fluid used. As the power output of the motor increases, the tendency for the motor to oscillate at low speeds also increases. Additionally, if the viscosity of the fluid used is materially different from that for which the device was designed, then the port size will have to be changed to compensate for the change in viscosity of the fluid. Variations inviscosity up to about 20% of the value thereof will not require a change in port size or device dimensions to compensate for the changed viscosity of the fluid.

Figure 4:
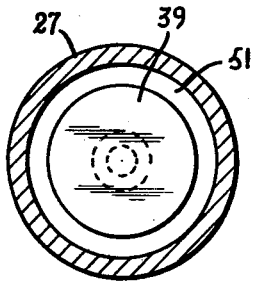
FIGS. 4, 5 and 6 are vertical cross-sectional views taken along line a—a of either FIG. 1 or 2 and depict additional structural embodiments of the invention.
Figure 5:
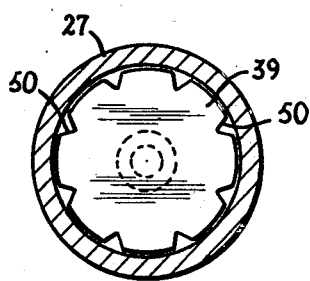
Figure 6:
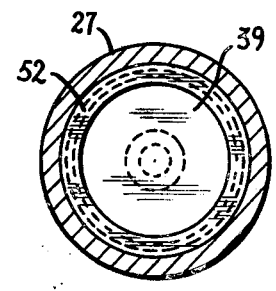

FIGS. 4, 5 and 6 illustrate other preferred way to establish fluid communication betwen subchambers. FIG. 4 shows an embodiment in which the diameter of the piston 39 is smaller than the internal diameter of the fluid chamber 27. Space 51 thus left between the piston and the fluid chamber wall serves the same function as the port 44 in FIGS. 1 and 2. The area of the space 51 is set to conform to the amount of damping desired in the system and for a device dimensionally similar to that of FIG. 1 or FIG. 2, the area of the space 51 is approximately the same as the area of port 44. In a particular system utilizing a motor between 30 and 60 horsepower, the difference between the internal diameter of the fluid chamber and the diameter of the piston should be between approximately .005 to .015 inch for a fluid viscosity of approximately SAE 80. In a given system, the space 51 will be larger or smaller according to the power output of the motor used and the viscosity of the fluid used and for power outputs other than that given, the space 51 should be adjusted accordingly. As set forth above, a viscosity variation of up to 20% can be tolerated without necessitating a change in the dimensions of the device.

FIG. 5 shows another embodiment of the invention in which fluid communication between subchambers is established by one or more serrations 50 cut into the circumferential surface of the piston. Obviously, the sum total of the cross sectional area of the serrations should be approximately equal to the area of the space 51 in FIG. 4 under similar conditions of operation as set forth above.

FIG. 6 discloses another embodiment of the invention in which the diameter of the piston 39 is less than the diameter of the fluid chamber 27. However, in this embodiment, the space between piston and chamber is covered by a flap 52 which is attached to the piston 39. The flap is preferably resilient and is mounted such that it bears against the inner wall of chamber 28. Under conditions in which no pressure differential exists between subchambers, the flap 52 will act as a seal between the piston and the fluid chamber 27. However, when a predetermined differential pressure is established between subchambers, the flap will respond to the pressure differential by moving toward the subchamber with the lower pressure, thereby allowing fluid to flow between subchambers. The open area between the piston 39 and the fluid chamber 27, which is closed by flap 52, should be aproximately the same as that for the embodiment of FIG. 4, except that in this particular embodiment an additional advantage is gained in that at low pressure differentials, the flap will not respond as fully as it would at higher pressure differentials, thereby increasing the system damping at small pressure diflerentials over the embodiment of FIGS. 1 through 5.

It will be understood that it is intended to cover all changes and modifications of the preferred embodiments of the invention herein chosen for the purpose of illustration which do not constitute departures from the spirit and scope of the invention.

What is claimed is:

1. In an outboard motor boat, the improvement comprising a device with a moveable element and fluid dampening means associated therewith for dampening oscillations of said outboard motor, said device being mounted between a steering cable end and the boat transom.

2. A device for dampening pivotal motion or oscillations of an outboard motor in a motor boat of the type that utilizes one or more cables for pivoting the outboard motor comprising a fluid chamber, said fluid chamber having a moveable element mounted therein, said moveable element dividing said fluid chamber into a plurality of subchambers, said moveable element being adapted to establish fluid communication between said subchambers, said element being adapted for movement within said fluid chamber in response to a pressure differential between said subchambers caused by said oscillations and by movement of said motor in a predetermined direction when it is pivoted in a steering operation, said pressure differential existing only when said motor is pivoted in said predetermined direction.

3. A device for dampening oscillations of an outboard motor in accordance with claim 2, said device further comprising resilient means, said resilient means being effective to urge said moveable element in at least one direction to a selected operable position within said fluid chamber.

4. A device for dampening oscillations of an outboard motor in accordance with claim 3, wherein said resilient means is additionally effective to remove slack from an outboard motor steering cable.

5. A device for dampening oscillations of an outboard motor in accordance with claim 3, wherein said resilient means is a compression spring.

6. A device for dampening oscillations of an outboard motor in accordance with claim 3, wherein said resilient means is a tension spring.

7. A device for dampening oscillations of an outboard motor in accordance with claim 2, wherein said moveable element is a piston.

8. A device for dampening oscillations of an outboard motor in accordance with claim 7, said piston having a port therein for establishing fluid communication between said subchambers.

9. A device for dampening oscillations of an outboard motor in accordance with claim 8, wherein said piston is of less diameter than said fluid chamber, the space thus formed between said piston and said fluid chamber being effective to provide fluid communication between said subchambers.

10. A device for dampening oscillations of an outboard motor in accordance with claim 9, wherein a flap is mounted to said piston, said flap covering the said space between said piston and said fluid chamber, said flap additionally being in contact with the inner wall of said fluid chamber, said flap being moveable away from said inner wall in response to a pressure differential between said subchambers to establish fluid communication between said subchambers.

11. A device for dampening oscillations of an outboard motor in accordance with claim 7, said device further comprising a piston rod connected to said piston, said piston rod being effective to connect said piston to a steering cable system.

References Cited

UNITED STATES PATENTS

| | | | |
|---|---|---|---|
| 2,327,021 | 8/1943 | Cushman | 74—501.5 |
| 2,424,198 | 7/1947 | Tauscher | 74—501.5 |
| 3,084,566 | 4/1963 | Pistillo | 114—144 XR |
| 3,259,094 | 7/1966 | Schuler | 114—144 |

ANDREW H. FARRELL, Primary Examiner

U.S. Cl. X.R.

115—18